(12) United States Patent
Rowley

(10) Patent No.: US 6,848,719 B2
(45) Date of Patent: Feb. 1, 2005

(54) BENDABLE POLYMER-LINED WATER HEATER CONNECTOR

(76) Inventor: William W. Rowley, 35 Wilding Chase, Chagrin Falls, OH (US) 44022

( * ) Notice: Subject to any disclaimer, the term of this patent is extended or adjusted under 35 U.S.C. 154(b) by 0 days.

(21) Appl. No.: 09/682,467

(22) Filed: Sep. 6, 2001

(65) Prior Publication Data
US 2002/0024220 A1 Feb. 28, 2002

(51) Int. Cl.$^7$ .............................................. F16L 35/00
(52) U.S. Cl. ...................... 285/55; 285/226; 285/334.5
(58) Field of Search ...................... 285/226, 55, 334.5, 285/903, 222.1, 222.2, 332.2

(56) References Cited

U.S. PATENT DOCUMENTS

| | | | |
|---|---|---|---|
| 746,497 A | * 12/1903 | Greenfield | 285/222.2 |
| 2,357,669 A | * 9/1944 | Lake | 285/222.5 |
| 2,415,472 A | * 2/1947 | Dorman | 285/148.13 |
| 2,613,958 A | * 10/1952 | Richardson | 285/55 |
| 3,013,310 A | 12/1961 | Foster et al. | |
| 3,228,096 A | * 1/1966 | Albro | 29/890.15 |
| 3,338,598 A | * 8/1967 | Kurtz | 285/55 |
| 3,399,908 A | * 9/1968 | Kurtz | 285/55 |
| 3,470,900 A | 10/1969 | Rothauser | |
| 3,719,209 A | 3/1973 | Rush et al. | |
| 3,723,946 A | 3/1973 | Weatherup et al. | |
| 3,743,328 A | * 7/1973 | Longfellow | 285/226 |
| 3,843,300 A | 10/1974 | McFarlane | |
| 3,917,497 A | 11/1975 | Stickler | |
| 3,929,958 A | 12/1975 | Parmann | |
| 4,005,879 A | 2/1977 | Berger et al. | |
| 4,009,982 A | 3/1977 | Maier | |
| 4,014,568 A | 3/1977 | Carter et al. | |
| 4,039,212 A | 8/1977 | Skarud | |
| 4,081,190 A | 3/1978 | Itzler | |
| 4,113,813 A | 9/1978 | Wilson | |
| 4,135,961 A | 1/1979 | Yoshizawa et al. | |
| 4,140,739 A | 2/1979 | Cotton | |
| 4,152,817 A | 5/1979 | Cotton | |
| 4,175,917 A | 11/1979 | Cotton | |
| 4,177,237 A | 12/1979 | Ueno et al. | |
| 4,209,597 A | 6/1980 | Bremholt | |
| 4,264,490 A | 4/1981 | Berejka | |
| 4,264,661 A | 4/1981 | Brandolf | |
| 4,266,815 A | 5/1981 | Cross | |
| 4,316,870 A | 2/1982 | Rowley | |
| 4,342,800 A | 8/1982 | Changani et al. | |
| 4,343,800 A | 8/1982 | Kope et al. | |
| 4,343,864 A | 8/1982 | Berejka | |
| 4,446,084 A | 5/1984 | Rowley | |

(List continued on next page.)

FOREIGN PATENT DOCUMENTS

| | | |
|---|---|---|
| CA | 938952 | 12/1973 |
| DE | 28 38 731 | 3/1980 |
| EP | 033 587 A1 | 8/1981 |
| GB | 750906 | 6/1956 |
| GB | 1172566 | 12/1969 |
| GB | 1421530 | 1/1976 |
| WO | WO84/01988 | 5/1984 |
| WO | WO85/03251 | 8/1985 |

*Primary Examiner*—Eric K. Nicholson
(74) *Attorney, Agent, or Firm*—Buckingham, Doolittle & Burroughs, LLP; Louis F. Wagner

(57) ABSTRACT

This invention relates to a connector having an inner polymeric liner with either two opposed flared ends or one flared end and an opposed sealing end, a bendable outer metallic sleeve having two opposed flared ends of essentially similar geometry to either the polymeric liner flared ends or one flared end and an opposed sealing end shelf, and two outwardly facing threaded nuts, each of said nuts having a shelf which engages the opposed flared ends of said metallic sleeve. The connector will often have a ribbed segment between the ends and washers for sealing engagement with the interior wall end portion of the liner at the flared end.

7 Claims, 2 Drawing Sheets

U.S. PATENT DOCUMENTS

| | | | |
|---|---|---|---|
| 4,525,136 A | | 6/1985 | Rowley |
| 4,537,425 A | * | 8/1985 | Press et al. .................... 285/55 |
| 4,575,044 A | | 3/1986 | Gentry |
| 4,598,937 A | * | 7/1986 | Sugao .......................... 285/55 |
| 4,614,208 A | | 9/1986 | Skarelius |
| 4,643,457 A | * | 2/1987 | Press ........................... 285/55 |
| 4,664,423 A | | 5/1987 | Rowley |
| 4,690,632 A | | 9/1987 | Carrow |
| 4,783,303 A | | 11/1988 | Imgram |
| 4,803,033 A | | 2/1989 | Rowley |
| 4,887,852 A | | 12/1989 | Hancock |
| 4,991,876 A | | 2/1991 | Mulvey |
| 5,169,180 A | * | 12/1992 | Villoni et al. .................. 285/53 |
| 5,199,153 A | * | 4/1993 | Schulte-Ladbeck .......... 29/447 |
| 5,364,135 A | | 11/1994 | Anderson |
| 5,527,503 A | | 6/1996 | Rowley |
| 5,622,670 A | | 4/1997 | Rowley |
| 5,833,279 A | | 11/1998 | Rowley |
| 5,861,200 A | | 1/1999 | Rowley |
| 6,422,606 B1 | * | 7/2002 | Halstead ...................... 285/52 |

\* cited by examiner

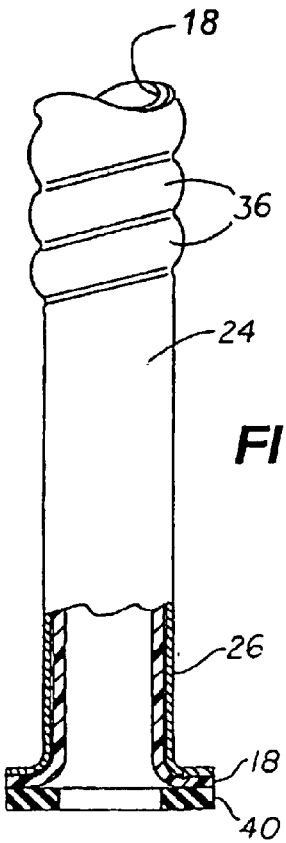
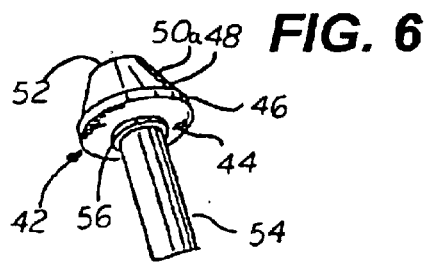
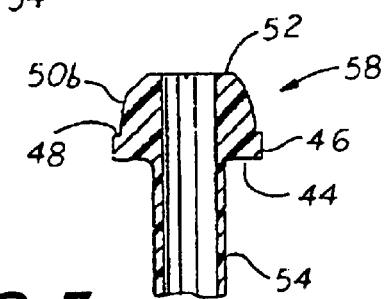
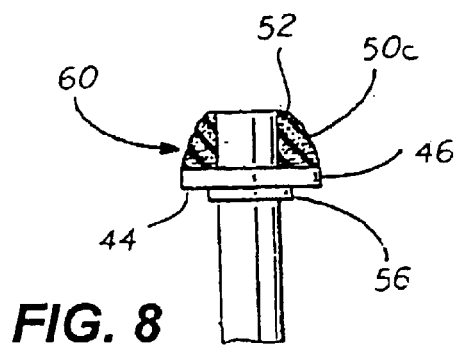
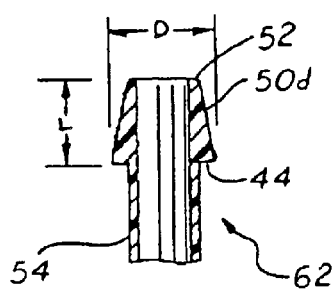
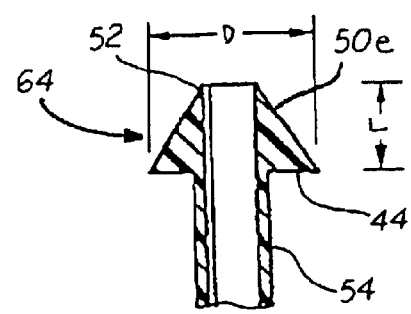

BENDABLE POLYMER-LINED WATER HEATER CONNECTOR

BACKGROUND OF INVENTION

Water heater tanks range in size, typically from 40–50 gallon tanks to 65–80 gallon tanks for residential service and even larger capacities are used for commercial service. As the size of the tank increases, the lateral distance between the inlet cold water tube and the exit hot water tube increases. This lateral distance may also change depending on the manufacturer of the hot water tank.

Typically, the inlet cold water supply and outlet hot water exit tubes are fixedly installed within a basement or lower level of a residence. In light of the fact that water heaters have finite lifetimes, their replacement often entails reconfiguring the inlet and outlet tubes through the use of elbows and custom-cut lengths of pipe to match the separation of the tubes of the tank. This impedes the rapid installation of new water heaters and typically requires the use of a professional to install the new tank.

More significantly, In 1992, the United States Environmental Protection Agency adopted a standard for lead and copper in municipal drinking water. The standard sets action levels for lead and copper in standing samples collected from faucets with the highest risk for elevated lead and copper levels. The action level for lead is 15.mu.g/liter of water; the action level for copper is 1.3 mg/liter of water. The source of these and other metals in drinking water is primarily corrosion of plumbing system components, which include copper and lead-based solder as well as carbon steel and brass. Current anticorrosion additives, which include phosphate salts and/or zinc salts, have been in use for many years, but do not always provide adequate protection. There remains a need for improved corrosion inhibitors which are not themselves likely to present a health hazard when added to water, and more specifically, there remains a need for combining an all-plastic inner liner water conduit with the strength of copper tubing.

The Prior Art has yet to identify a flexible polymer-lined plumbing connector which eliminates the need for custom fitting of inlet and outlet copper tubes as well as minimizes corrosion of plumbing system components, thereby enabling the system to be in compliance with Environmental Protection Agency guidelines for copper ions in potable water.

SUMMARY OF INVENTION

In this invention, a flexible plumbing tube is shown which permits existing copper tubing to be used with a new hot water tank which may or may not have the same lateral spacing between inlet and outlet openings.

It is an object of this invention to couple a flexible copper tube with an inner plastic lining.

It is another object of this invention to reheat at least one end of the plastic-lined copper tube and flare the plastic liner so as to have sealing engagement with the inner wall of the plastic tube.

It is still another object of this invention to reheat an entire length of the plastic tube inner liner, seal both ends of the tube, at least one sealed end permitting the ingress of a gas, e.g., compressed air which radially expands the inner plastic liner to conform to the internal geometry of the flexible copper tube.

These and other objects of this invention will be evident when viewed in light of the drawings, detailed description, and appended claims.

BRIEF DESCRIPTION OF DRAWINGS

The invention may take physical form in certain parts and arrangements of parts, a preferred embodiment of which will be described in detail in the specification and illustrated in the accompanying drawings which form a part hereof, and wherein:

FIG. 5 is a side plan view shown in partial cross-section of a larger flared flexible copper sleeve over the flared polymeric tube with optional washer shown sealing against the inner wall of the polymeric tube;

FIG. 6 is a perspective view of a radiused sealing surface end configuration (shown smaller than scale) with flared copper sleeve removed;

FIG. 7 is a cross-sectional view of a conical sealing surface end configuration (shown smaller than scale) with flared copper sleeve removed;

FIG. 8 is a side plan view of a conical sealing surface end configuration (shown smaller than scale) showing a separable conical nosecone with flared copper sleeve removed;

FIG. 9 is a cross-sectional view of a radiused sealing surface end configuration (shown smaller than scale) having a length/diameter (L/D) ratio greater than 1; and FIG. 10 is a cross-sectional view of a radiused sealing surface end configuration (shown smaller than scale) having a L/D ratio less than 1.

DETAILED DESCRIPTION

Figure 4:
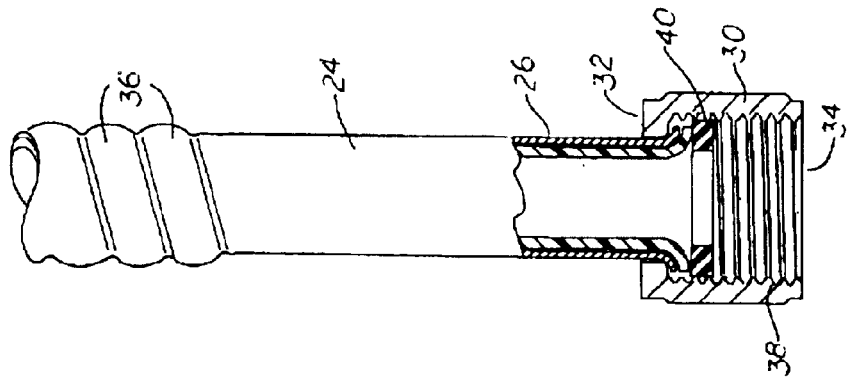
FIG. 4 is a side plan view shown in partial cross-section of a flared flexible copper sleeve over the flared polymeric tube with optional washer shown sealing against the inner wall of the polymeric tube.

Referring now to the drawings wherein the showings are for purposes of illustrating the preferred embodiment of the invention only and not for purposes of limiting the same, the Figures show a method and product which results from the practice of the invention producing a flexible tubing connector, particularly suited for water heater connectors.

Figure 3:
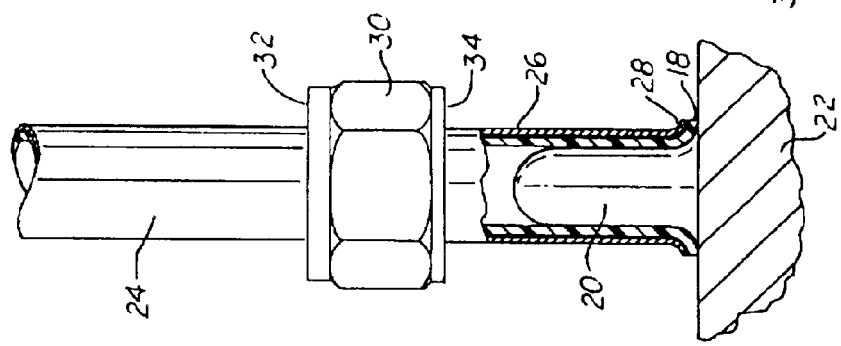
FIG. 3 is a side plan view showing the insertion of a flared copper sleeve over the flared polymeric tube.
Figure 2:
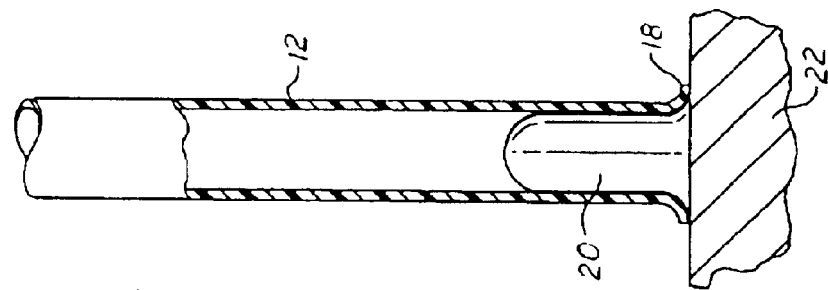
FIG. 2 is a side plan view similar to FIG. 1 showing the insertion of a pin into the heated end of the polymeric tube to flare the tube.
Figure 1:
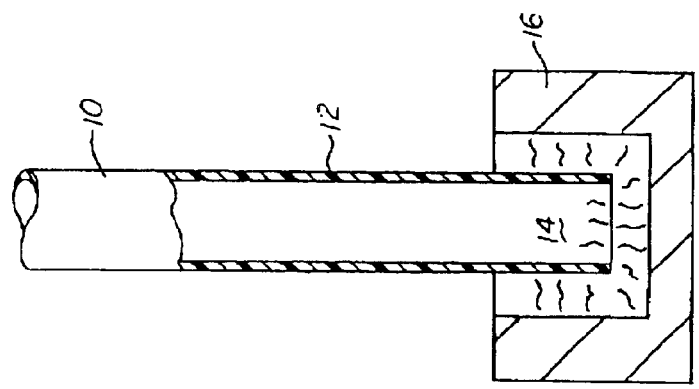
FIG. 1 is a side plan view shown in partial cross-section of one end of a polymeric tube being heated.

This discussion will focus on the technology used to fabricate at least one flared end in a tubing connector, wherein the thickness of the tubing walls at the flared end may or may not have been compromised. As seen in FIGS. 1–3, the process involves heating at least a portion 14 of a polymeric tube 10 using a heating device 16 followed by vertical insertion of a pin 20 into the tube, thereby flaring at least one end 18 thereof. The heating of the tube may be accomplished in a variety of ways, including electric heaters, hot air and other means known to those of skill in the art, the choice of heating method being at least somewhat dependent upon the degree of heating required and access to various modes of energy at the location of the heating operation. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold. While those skilled in the art are familiar with the temperatures described in this operation (e.g., 600–900° F., for illustrative purposes only, this temperature would be approximately 700° F. ±25° F. for a time of between 10–30 seconds in the case of polypropylene, and approximately 700° F. ±25° F. for a time between 15–35 seconds for partially crosslinked polyethylene). The key is to balance temperature, dwell time within the heating blocks as well as the physical distance separating the heating block surface from the polymer. It is well within the skill of those in the art to vary the time and/or temperatures noted to achieve the desired degree of softness necessary for further processing. After the desired amount of heat is applied, the heating blocks are removed. Depending upon the polymer and/or time and/or temperatures used, a cooling cycle may be employed before the initiation of the next step.

After at least partially cooling the flared end of the tube, a flared 28 copper sleeve 24 is inserted thereupon. The copper sleeve can be inserted either prior to removal of pin 20 or subsequent to the removal of the pin depending on the degree of softness of polymeric material. Additionally, the copper sleeve can be longitudinally retracted or slid in a rearward direction from the end to expose the plastic tube for molding. As illustrated in FIG. 4, the sleeve sleeve typically has two outwardly facing 34 multi-faceted brass (or plastic) nuts 30 (only one of which is shown) which permit threaded 38 leak-tight engagement with a mating male fitting. The nuts have an inwardly facing shelf 32 to facilitate the leak-tight engagement. Optionally, a washer is interposed between the flared sleeve and male fitting. In a preferred embodiment, the copper sleeve is expanded to include spiral ridges 36 which permit more flexible bending of the polymer lined copper sleeve. After formation of one end of the tube, it is recognized that the opposed end will be treated in a similar manner to form the connector with two opposed nuts, one at each end.

In another embodiment of the invention, a significant portion of the entire length of polymeric tubing 10 is heated prior to insertion into the copper sleeve 24 or while inserted within the sleeve. Both ends of the tubing 10 are sealed and the walls of the tube expanded laterally through an increase in pressure within the tube, typically through the insertion of a compressed gas, e.g., compressed air, nitrogen, etc through one of the sealed ends. The lateral expansion of the tubing walls will continue until stopped by the internal geometry of the copper sleeve. It is recognized however, that heating the entire tube is optional, and not a necessary component of the invention.

While the invention thus far described has focused on flared ends upon which the sealing surface is the inner wall of the polymer liner, there is no need to limit the invention to such. In fact, within the scope of this invention are connectors for which one end is flared while a second opposed end has a sealing surface such as that illustrated in FIGS. 6–10.

In FIG. 6, a sealing end cap 42 is shown which comprises a radiused sealing surface 50a extending from the end face 52 of the tube to radially extending flange 46. The end face of the tube has a slightly larger O.D. than the remainder of the tube so that the wall of the tube at the sealing surface is substantially enlarged throughout its length. The sealing surface terminates in the flange 46 which includes an optional stop face 48 adjacent the sealing surface and a shoulder 44 on the opposite side. From the shoulder to the O.D. of the tube, there is provided an optional fillet 56 which joins the flange spaced from the peripheral edge thereof to the tube.

In FIG. 7, a sealing end cap 58 is shown wherein the optional fillet 56 is shown removed and the sealing surface 50b is shown as conical. FIG. 8 illustrates yet another embodiment of the sealing end cap 60 wherein a separable nosecone sealing surface 50c is illustrated, the nosecone terminating on a shelf 44 having two opposed sides. The impact of aspect ratios is illustrated in FIGS. 9–10 wherein a length (L) to width (W) ratio is indicated to be less than 1 in FIG. 9 and this same L/D ratio is greater than 1 in FIG. 10. The geometry of the sealing bulb may be modified so as to accommodate increased or decreased rigidity which is associated with various thermoplastics and thermosets. The value in having this ratio greater than 1 resides in the increased structural integrity which is accorded to the piece by having a greater penetration depth of the bulb into the receiving piece (not shown). As lateral expansion forces radially increase the pressure within the bulb, the increased surface area contact with the vertical walls of the receiving piece, permits polymers with inferior physical properties (e.g., less stiffness and more creep), to perform under conditions where they would have been expected to fail.

When fabricating a sealing end as illustrated, one method which is applicable to form the desired configuration involves two molds, a top vertically fixed mold and a vertically movable bottom mold. The top mold or die includes a central bore and a tube secured to the top thereof having an O.D. essentially the same as the I.D. of the bore. The lower surface of the top mold is provided with a cylindrical projection projecting centrally therefrom.

The bottom mold includes a body which may include an annular passage for the circulation of cooling medium therethrough. The body is threadedly connected to a rod of a piston-cylinder assembly and adjustably locked thereto by a nut. The top of the bottom mold or die is provided with a central recess which includes an upper cylindrical portion into which the axial projection of the top mold is designed closely to telescope. The lower end of the cylindrical portion is provided with a shoulder separating the cylindrical portion of the recess from the sealing surface or bulb forming cavity. The lower bulb forming cavity is provided with a horizontal circular axially facing end face which is selectively larger in diameter than the diameter of the bore and dimensioned so as to permit the formation of the sealing surface geometries 50a–e shown in FIGS. 6–10. Projecting axially from the bottom of the recess of the lower die is a guide rod, the top of which is provided with a pilot nose or pointed portion.

In operation, the top and bottom molds or dies have been brought to an intermediate position relative to each other in that the bottom mold has been brought to an intermediate elevated position and the position may be determined by a retractable adjustable stop. In such position, the pilot nose of the guide rod projects into the bore of the tube.

A thermoplastic or thermoset plastic tube section, cut to a predetermined length, is now inserted downwardly through the guide tube to project from the lower end of the top mold. The dimensions of the tube O.D. and I.D. are such that the tube will fit snugly in the I.D. of the bore with the I.D. of the tube fitting snugly over the O.D. of the axially projecting rod. It is important that the tube project a predetermined distance below the top mold.

With the molds still in their intermediate position and the tube properly positioned and projecting from the top mold, the projecting end of the tube is now heated. The heating of the tube may be accomplished in a variety of ways, e.g., two heating blocks, each provided with electrical heating elements, to confine the projecting end of the tube therebetween. It will of course be appreciated that other forms of the application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures of the heating blocks described in this operation (e.g., 600–900.degree. F.), for illustrative purposes only. The key is to balance the temperature and dwell time within the heating blocks. It is well within the skill of those in the art to vary the time and/or temperatures noted to achieve the desired degree of softness necessary for further processing. Stated alternatively, the key is the temperature to which the polymer wall is heated, so that it can be molded into an alternative configuration, i.e., reformed into a second shape (e.g., bulb) with memory to stay in this shape.

After the desired amount of heat is applied, the heating blocks are removed. Depending upon the polymer and/or temperatures used, a cooling cycle may be employed before the initiation of the next step. As the bottom mold moves upwardly, the axial projection of the top mold telescopes within the cylindrical recess of the bottom mold. The bottom mold continues upwardly forming the tube end as indicated in FIGS. 6–10.

After the mold has been cooled for a predetermined time, the piston-cylinder assembly of the rod is fully retracted and the top mold may be indexed horizontally so that the now formed tube may be removed. If any flash appears, it can be readily removed from the tube. While the discussion has focused on the top mold being of unitary construction, it is equally envisioned that a split mold could be employed. In this embodiment, the piston-cylinder assembly is fully retracted, the split halves of the top mold would be opened and the part removed from the top mold in a vertical direction.

In one aspect of this invention, the tubes are pre-heated outside of the fabrication cycle. This allows a manufacturer to use a tube which is essentially almost completely ready to reform in the molding cycle which thereby decreases fabrication cycle time. If for example, the total molding cycle time is 30 seconds for heating, 5 seconds for molding and 10 seconds for cooling, it is possible to use a 10 or 20 second pre-heat to achieve essentially 60–80% of the molding temperature prior to introduction into the mold. In some specialized applications, it is possible to heat up to 100% of the reforming temperature, but this requires precise cycle time control.

Therefore, at least in one aspect of the invention is the use of a profile heating means, e.g., heated mold or heated oven, which pre-heats at least a portion of the essentially linear profile to a temperature which is sufficient to permit bending (formability or plasticizing) of the profile, but not melt-processing of the profile. As used in this application, this initial temperature or first temperature, is one in which the profile still maintains at least a minimal degree of structural integrity, yet which is still pliable or formable, at least partially plasticized. Phrased alternatively, the modulus of elasticity of the polymeric profile is not so high so as to return to the original essentially linear profile after the externally applied bending force is removed. The polymer is fairly non-adherent, ductile, easily deformable, yet is still below the melt temperature of the polymer. The term second temperature, as used in the application means the temperature at which the profile becomes processable from an initial profile into a reshaped profile upon the application of heat and pressure. Often this temperature will be the temperature at which the polymer is melt-processable or essentially melt processable. At this temperature and upon the application of a sufficient amount of pressure the polymer is reformed from an initial shape and profile into a second shape and profile. It will be understood that as this second temperature approaches the melt temperature of the polymer, less pressure will be required to convert the profile from its initial shape into a second shape. In order to make this process commercially viable, both the initial profile is preheated as well as the profile heating means, e.g., mold. This enables cycle times to be decreased. Additionally, by preheating the molds, it is possible to avoid the phenomenon of "freezing" which may occur in molding operations when the polymeric profile contacts the cold surface of a mold.

It will be appreciated that the tooling illustrated may be either horizontally or vertically oriented. In practicing the process, it is important however, that the projecting heated end of the tube substantially conform to the volume of the mating recesses in the two dies or molds. Whether employed horizontally or vertically, the relatively fixed mold may be termed the female mold while the moving mold with the guide rod projecting therefrom and holding the I.D. of the tube may be termed the male mold or die. Depending on the equipment available, the end application requirements, cost factors, etc., the starting polymeric tubing material will be different. For many applications, polyolefins, e.g., polypropylene, polyethylene, etc., are preferred. Depending on the application, the polyethylene may be crosslinked, or partially crosslinked. The crosslinking of the polyethylene may be effected in two stages, with an initial degree of crosslinking being less than 50%, preferably less than 35%, followed by postextrusion processing, and ultimately a second degree of crosslinking raising the final degree of crosslinking to at least 60% or higher, often to 85%. Cost usually decides which crosslinking method needs to be used to provide a given quality of tubing.

In the practice of this invention, illustrative and non-limiting examples of the polymers which may be used in various combinations to form the plastic conduit include any and all thermoplastics and thermosets, including blends thereof.

Therefore, in a first embodiment, what has been described specifically above, may be more generically described as a connector having (1) an inner polymeric liner having two opposed flared ends; (2) a bendable outer metallic sleeve having two opposed flared ends of essentially similar geometry to said polymeric liner flared ends; and (3) two outwardly facing threaded nuts, each of said nuts having a shelf which engages said opposed flared ends of said metallic sleeve. In a preferred embodiment, the metallic sleeve will have a ribbed segment between said two opposed flared ends. While it is possible to effect sealing engagement with an interior wall of said polymeric liner due to the flaring of the liner, it is often supplemented with a washer for sealing engagement with each interior end wall portion of said polymer liner. In a specialized embodiment, the polymeric liner will essentially conform to said ribbed segment. While the connector has been described as a two-ended adapter, it is equally possible that the connector will have only one flared end, the other end being connected using typical plumbing connections. In a second embodiment, what has been described specifically above, may be more generically described as a connector having (1) an inner polymeric liner having one flared end and an opposed sealing surface; (2) a bendable outer metallic sleeve having two opposed flared ends of essentially similar geometry to conform to the one flared end and to conform to the shelf adjacent the sealing surface of the opposed end; and 93) two outwardly facing threaded nuts, each of the nuts having a shelf which engages the flared aspect of the metallic sleeve. In a similar manner to that described above, the sleeve will have a ribbed middle segment between the ends of the connector. Once again, while it is possible to effect sealing engagement with either the sealing end or the flared end, the flared end is often supplemented with a washer for sealing engagement with the interior wall end portion of the polymer liner.

In order to form this connector, there are several processing sequences which can be employed. In one sequence, the process will include: (1) heating one end of a polymeric tube; (2) inserting a pin into the heated tube end; (3) Flaring the heated tube end or molding the heated tube end into a sealing surface; (4) inserting a metallic sleeve having two outwardly facing nuts over the tube; (5) heating an opposed end of the polymeric tube; and either (6) flaring the opposed heated tube end or forming a sealing surface from the wall of the heated tube by melt processing of the polymer depending on whether the resultant connector has two flared ends or a combination flared end with opposed sealing surface end. Alternatively, the process sequence will include: (1) heating one end of a polymeric tube; (2) inserting a pin into the heated tube end; (3) flaring the heated tube end; (4) inserting a flared metallic sleeve having two outwardly facing nuts over the tube; (5) heating an opposed end of the polymeric tube; and either (6) flaring said opposed heated tube end or forming a sealing surface from the wall of the heated tube by melt processing of the polymer depending on whether the resultant connector has two flared ends or a combination flared end with opposed sealing surface end.

In still yet another embodiment of the invention, the process will include a processing sequence as follows: (1) heating one end of a polymeric tube; (2) inserting a pin into the heated tube end; (3) flaring the heated tube end; (4) heating a non-end portion of the polymeric tube; (5) inserting a flared metallic sleeve having two outwardly facing nuts over the tube, the sleeve having at least one ribbed portion between the sleeve ends; (6) sealing both ends of the polymeric tube; (7) increasing the pressure within the sealed tube to radially expand said tube in the heated non-end portion which corresponds at least in part with said ribbed portion; (8) heating an opposed end of the polymeric tube; and either (9) flaring the opposed heated tube end or forming a sealing surface from the wall of the heated tube by melt processing of the polymer depending on whether the resultant connector has two flared ends or a combination flared end with opposed sealing surface end.

Yet another variation would include: (1) heating one end of a polymeric tube; (2) Inserting a pin into the heated tube end; (3) flaring the heated tube end; (4) inserting a flared metallic sleeve having two outwardly facing nuts over the tube, the sleeve having at least one ribbed portion between the sleeve ends; (5) heating the ribbed portion of the metallic sleeve; (6) sealing both ends of the polymeric tube; (7) increasing a pressure within the sealed tube to radially expand the tube in the heated non-end portion which corresponds at least in part with said ribbed portion; (8) heating an opposed end of the polymeric tube; and either (9) flaring said opposed heated tube end or forming a sealing surface from the wall of the heated tube by melt processing of the polymer depending on whether the resultant connector has two flared ends or a combination flared end with opposed sealing surface end.

This invention has been described in detail with reference to specific embodiments thereof, including the respective best modes for carrying out each embodiment. It shall be understood that these illustrations are by way of example and not by way of limitation.

What is claimed is:

1. A connector for liquids which comprises:
    (a) an inner polymeric liner having one flared end and an opposed integrally molded sealing end, said liner having a centrally disposed bore therethrough, and wherein said sealing end comprises
        (i) a radially extending sealing surface from said liner, and
        (ii) a shoulder which terminates the sealing surface, and wherein said bore of said sealing end is essentially the same as said bore of said liner,
    (b) a bendable outer metallic sleeve having two opposed flared ends of similar geometry to each of said polymeric liner flared end and said shoulder of said sealing end; and
    (c) two outwardly facing threaded nuts, each of said nuts having a shelf which contactingly engages said opposed flared ends of said metallic sleeve.

2. The connector of claim 1 wherein said metallic sleeve further comprises
    (a) a ribbed segment between said two opposed flared ends of said metallic sleeve.

3. The connector of claim 2 which further comprises
    (a) a washer for sealing engagement with an interior end portion of said liner at said flared end.

4. The connector of claim 3 wherein
    (a) said inner polymeric liner essentially conforms to said ribbed segment.

5. A connector for liquids which comprises:
    (a) an inner polymeric liner having one flared end and an opposed integrally molded sealing end, said liner having centrally disposed bore therethrough, and wherein said sealing end comprises
        (i) a radially extending sealing surface from said liner, and
        (ii) a shoulder which terminates the sealing surface, and wherein said bore of said sealing end is essentially the same as said bore of said liner,
    (b) a bendable outer metallic sleeve having two opposed flared ends of similar geometry to each of said polymeric liner flared end and said shoulder of said sealing end and a plurality of ribs between said two opposed flared ends of said metallic sleeve; and
    (c) two outwardly facing threaded nuts, each of said nuts having a shelf which contactingly engages said opposed flared ends of said metallic sleeve.

6. The connector of claim 5 wherein
    (a) said inner polymeric liner essentially conforms to said ribbed segment.

7. The connector of claim 6 which further comprises
    (a) a washer for sealing engagement with an interior end portion of said liner at said flared end.

* * * * *